(12) United States Patent
Munehira et al.

(10) Patent No.: US 7,539,413 B2
(45) Date of Patent: May 26, 2009

(54) OBSERVATION APPARATUS AND OBSERVATION SYSTEM

(75) Inventors: Hiroaki Munehira, Tokyo (JP); Junichi Nakagawa, Tokyo (JP); Toshiyuki Tokura, Tokyo (JP); Kenichi Asakawa, Kanagawa (JP); Hitoshi Mikada, Kanagawa (JP); Katsuyoshi Kawaguchi, Kanagawa (JP)

(73) Assignees: Mitsubishi Denki Kabushiki Kaisha, Tokyo (JP); Independent Administrative Institution, Japan Agency for Marine-Earth Science and Technology, Yokosuka-shi (JP)

( * ) Notice: Subject to any disclaimer, the term of this patent is extended or adjusted under 35 U.S.C. 154(b) by 522 days.

(21) Appl. No.: 11/078,339

(22) Filed: Mar. 14, 2005

(65) Prior Publication Data

US 2005/0259264 A1 Nov. 24, 2005

(30) Foreign Application Priority Data

May 19, 2004 (JP) ............................ 2004-149337

(51) Int. Cl.
*H04B 10/08* (2006.01)
*H04B 10/00* (2006.01)
*H04B 10/02* (2006.01)

(52) U.S. Cl. ............................ 398/31; 398/32; 398/33; 398/167; 398/177

(58) Field of Classification Search .............. 398/30–33, 398/82, 104, 105, 177, 167
See application file for complete search history.

(56) References Cited

U.S. PATENT DOCUMENTS 4,436,365 A 3/1984 Hodgins et al. ................ 398/8

| | | | |
|---|---|---|---|
| 5,296,957 A * | 3/1994 | Takahashi et al. ........... 398/177 |
| 5,485,299 A | 1/1996 | Jones ........................... 398/37 |
| 5,504,606 A * | 4/1996 | Frigo ........................... 398/58 |
| 5,559,624 A * | 9/1996 | Darcie et al. ................. 398/72 |
| 5,920,413 A | 7/1999 | Miyakawa et al. |

(Continued)

FOREIGN PATENT DOCUMENTS

EP 0 751 635 A2 1/1997

(Continued)

*Primary Examiner*—Dalzid Singh
(74) *Attorney, Agent, or Firm*—Oblon, Spivak, McClelland, Maier & Neustadt, P.C.

(57) ABSTRACT

The present invention discloses a submarine observation system in which a plurality of carrier lights assigned to each submarine observation equipment is transmitted from a land terminal apparatus to an optical submarine cable (down-going) by using a WDM transmission. In the submarine observation equipment, only a prescribed carrier light is demultiplexed by an optical demultiplexer, an observation signal indicating an observation result is generated by an observation device, intensity of the carrier light demultiplexed by the optical demultiplexer is modulated by an optical amplifier based on an observation signal, and the modulated carrier light is multiplexed by an optical multiplexer. The multiplexed carrier light is output to the optical submarine cable (up-going) to be returned to the land terminal apparatus being the transmission station. The land terminal apparatus is able to obtain an observation signal of each observation point by separating carrier lights based on each wavelength and receiving a separated carrier light of each wavelength. Accordingly, the system can be structured with one optical fiber and can be extendable by increasing or decreasing carrier lights, and either one of the land terminal apparatuses can receive an observation signal even when the optical submarine cable is cut off.

19 Claims, 6 Drawing Sheets

U.S. PATENT DOCUMENTS 6,359,708 B1 * 3/2002 Goel et al. .................... 398/15
6,738,584 B1 * 5/2004 Tsuda et al. ................ 398/147

FOREIGN PATENT DOCUMENTS

| | | |
|---|---|---|
| GB | 2 403 087 B | 3/2008 |
| JP | 06-141002 | 5/1994 |
| JP | 09-018410 | 1/1997 |
| JP | 09-211140 | 8/1997 |
| JP | 09-218273 | 8/1997 |
| JP | 09-275378 | 10/1997 |
| JP | 2002-40152 | 2/2002 |
| JP | 2003-032192 | 1/2003 |

* cited by examiner

OBSERVATION APPARATUS AND OBSERVATION SYSTEM

BACKGROUND OF THE INVENTION

1. Field of the Invention

The present invention relates to an observation system, and in particular, relates to technology for transmitting observation signals (data indicating observation results, such as vibrations caused by an earthquake, water pressure changes due to tsunami) acquired by submarine observation, through an optical fiber cable, for example.

2. Description of the Related Art

In a conventional submarine observation system, an observation signal can be transmitted to a land terminal apparatus from a submarine observation equipment even when an optical submarine cable is cut off. Moreover, for the purpose of enhancing utilization efficiency of the optical fiber of the optical submarine cable, the conventional submarine observation system has a structure where each of a plurality of submarine observation equipment outputs observation optical signals from two ports to two different optical fibers at the same time, and the outputted signals are respectively transmitted to two different land terminal apparatuses via different channels. (see Patent Documentation 1, for example) Furthermore, in the submarine observation system, observation equipment is laid on the deep-sea site at thousands of meters deep, and operated under harsh environment of hundreds of pressure. Therefore, if the equipment fails, immense expense is needed for its recovery and re-laying. Thus, very high reliability is required for the equipment installed in the sea.

[Patent Documentation 1] Japanese Unexamined Patent Publication No. JP2002-40152. Page 6, FIG. 1

SUMMARY OF THE INVENTION

The conventional submarine observation system is structured as mentioned above. Therefore, it is necessary to install an optical transmitter in the observation equipment which is set up in the seabed, so as to transmit an observation signal to each land terminal apparatus, and necessary to prepare an optical fiber to be connected to the land terminal apparatus, in each observation equipment. In recent years, the number of observation equipment expected to be installed is enormously increasing in the submarine observation system. Then, if the optical fiber is individually used for each of the observation equipment expected to be installed, it has a problem of causing high cost. Moreover, as observing for a long time and on real time is highly demanded, each equipment and system needs to have high reliability.

In order to react to the increase of the number of observation equipment, applying a WDM (Wavelength Division Multiplex) system can be considered. In the WDM system, an observation signal is transmitted by multiplexing a plurality of optical wavelength signals to one fiber. Therefore, the WDM system requires high wavelength stability. For this reason, in order to enhance the wavelength stability, an element temperature of a light source needs to be kept constant. Then, it is necessary to add circuit devices, such as Perruche control and a wavelength locker, to an optical transmitter installed in the observation equipment. Consequently, the apparatus scale expands or the reliability deteriorates, which causes a problem that applying the WDM system becomes difficult.

A main object of the present invention is to solve the above problems. Therefore, it is one of objects to cut down the system cost by reducing the number of optical fibers in the optical submarine cable. Moreover, it is one of the objects to structure an observation system where robustness is enhanced by enabling an observation signal to be transmitted to either one of the land terminal apparatuses even when a failure, such as cutting of an optical submarine cable, occurs. Furthermore, it is one of the objects to provide an observation system having high extensibility and reliability where various optical transmission methods can be used.

According to one aspect of the observation apparatus of the present invention which performs prescribed observation and notifies a management apparatus of an observation result, the observation apparatus includes:

a signal reception part to receive a signal transmitted from the management apparatus;

an observation signal generation part to perform the prescribed observation and to generate an observation signal indicating the observation result;

a signal modulation part to modulate the signal received by the signal reception part, by using the observation signal generated by the observation signal generation part; and a signal transmission part to return the signal modulated by the signal modulation part to the management apparatus.

According to one aspect of an observation system of the present invention, the observation system includes:

at least one or more than one management apparatus and;

at least one or more than one observation apparatus to perform a prescribed observation and notify the at least one management apparatus of an observation result, and wherein each management apparatus transmits a signal to the at least one observation apparatus and each observation apparatus receives the signal transmitted from the at least one management apparatus, performs a prescribed observation, generates an observation signal indicating an observation result, modulates a received signal by using a generated observation signal, and returns a modulated signal to the management apparatus being a transmission station.

According to the present invention, since a signal modulated by using an observation signal is transmitted back to a management apparatus, when the channel between the management apparatus and the observation apparatus is an optical submarine cable, the system cost-down can be realized by reducing the number of optical fibers in the optical submarine cable, based on applying the WDM system. Besides, a high robustness system can be structured since the observation signal can be transmitted to either one of the land terminal apparatuses even when a failure, such as cutting of an optical submarine cable, occurs. Moreover, high reliability can be secured especially by utilizing a modulation method which uses the optical amplifier practically used in the optical submarine cable system for communication, in the submarine observation.

BRIEF DESCRIPTION OF THE DRAWINGS

A complete appreciation of the present invention and many of the attendant advantages thereof will be readily obtained as the same becomes better understood by reference to the following detailed description when considered in advantages thereof will be readily obtained as the same becomes better understood by reference to the following detailed description when considered in connection with the accompanying drawings, wherein.

DESCRIPTION OF THE PREFERRED EMBODIMENTS

Embodiment 1

Figure 1:
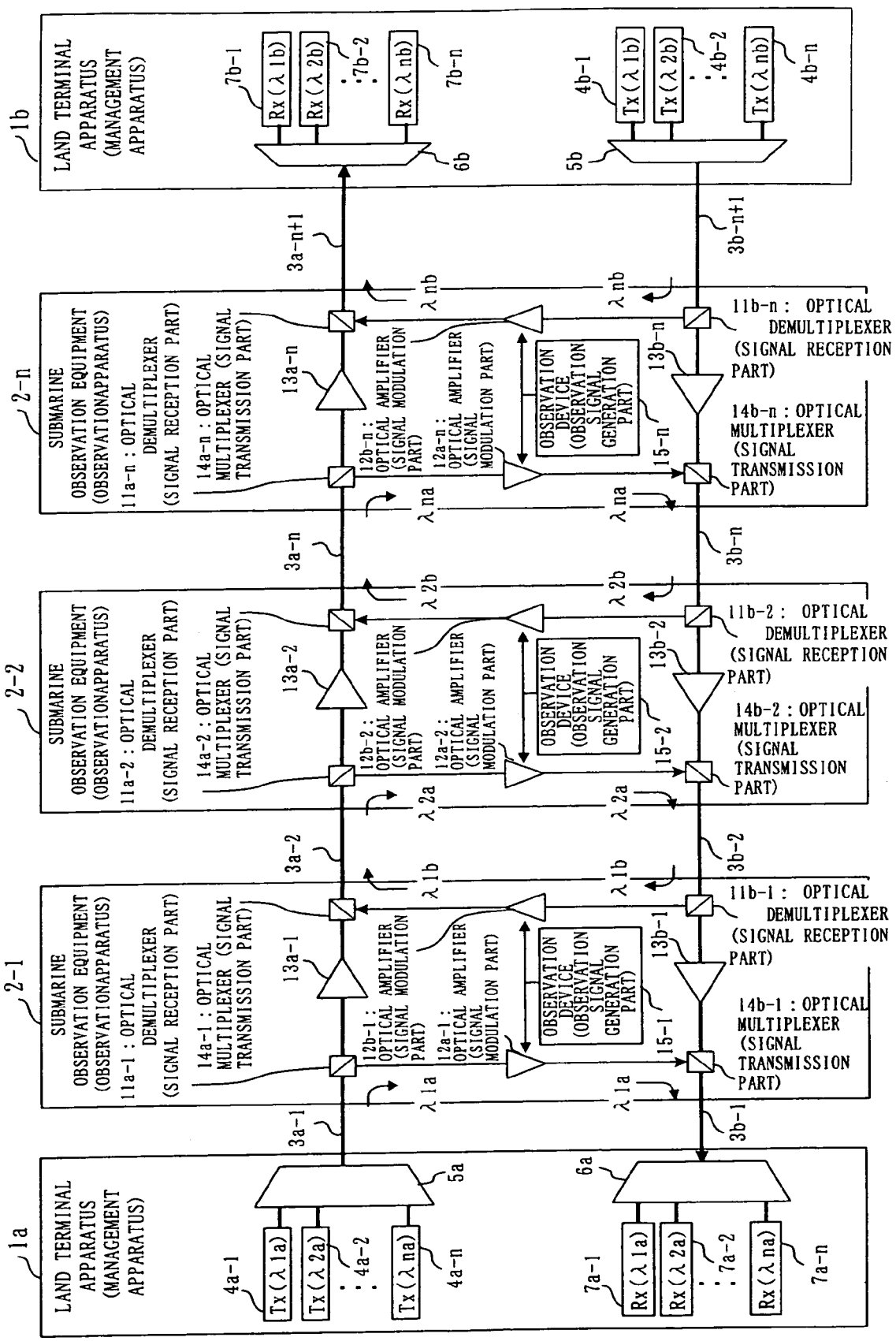
FIG. 1 shows a structure example of a submarine observation system according to Embodiment 1.

The submarine observation system according to Embodiment 1 will now be explained with reference to drawings. FIG. 1 is a structure figure showing an example of the submarine observation system according to Embodiment 1.

As shown in FIG. 1, the submarine observation system according to Embodiment 1 is composed of two land terminal apparatuses 1a and 1b, n submarine observation equipment 2-1 to 2-n in cascading connection (n is an line) (second transmission line) for respectively connecting the land terminal apparatus 1 and the submarine observation equipment 2. Each of the n submarine observation equipment 2-1 to 2-n is cascadingly connected by the optical submarine cable. One pair of the optical submarine cables composed of the down-going line and the up-going line is called one fiber pair. The optical submarine cable of one fiber pair functionally means two optical submarine cables, namely the one from the land terminal apparatus 1a to 1b and the other from the land terminal apparatus 1b to 1a. A plurality of the optical submarine cables physically connected in series is also herein represented as the optical submarine cable of one fiber pair. In addition, the land terminal apparatus is equivalent to a management apparatus, and the submarine observation equipment is equivalent to an observation apparatus.

The land terminal apparatus 1a is composed of n optical transmitters 4a-1 to 4a-n, an optical multiplexer 5a, an optical demultiplexer 6a, and n optical receivers 7a-1 to 7a-n. The n optical transmitters 4a-1 to 4a-n transmit carrier lights being different from each other and having been assigned in advance, to each of the submarine observation equipment 2-1 to 2-n. In order to simplify the explanation, the carrier light to be assigned to the submarine observation equipment is represented as λn (n is an integer being one or more than one) corresponding to the submarine observation equipment 2-n. The optical multiplexer 5a multiplexes the carrier lights being different from each other and outputted from the optical transmitters 4a-1 to 4a-n. The optical demultiplexer 6a demultiplexes a plurality of multiplexed carrier lights outputted from each of the submarine observation equipment 2-1 to 2-n, into each carrier light. The n optical receivers 7a-1 to 7a-n respectively receive n carrier lights demultiplexed by the optical demultiplexer 6a. The land terminal apparatus 1b has the same structure as the land terminal apparatus 1a except that the communication direction of the optical signal of the land terminal apparatus 1b is opposite to that of the land terminal apparatus 1a.

Next, the structure of the submarine observation equipment 2 will be explained. The submarine observation equipment 2-1 is described herein as an example, and other submarine observation equipment has the same structure and function as the submarine observation equipment 2-1.

The optical demultiplexer 11a-1 demultiplexes only a carrier light λ1a, which has been assigned to the submarine observation equipment 2-1 beforehand, in the optical signal wavelength-multiplexed and outputted from the land terminal apparatus 1a as a signal of the down-going line, and receives the demultiplexed carrier light. An optical amplifier 12a-1 amplifies the carrier light demultiplexed by the optical demultiplexer 11a-1. In this case, the optical amplifier 12a-1 modulates the carrier light by changing the intensity of amplification by using an observation signal observed by an observation device 15-1. An optical amplifier 13a-1 amplifies a carrier light remaining after the carrier light for the submarine observation equipment 2-1 was extracted by the optical demultiplexer 11a-1. An optical multiplexer 14a-1 multiplexes the carrier light which was demultiplexed by an optical demultiplexer 11b-1 in the up-going direction and modulated by an optical amplifier 12b-1 in the up-going direction, with the carrier light after amplified by the optical amplifier 13a-1. The observation device 15-1 performs various kinds of science observation (observation of vibrations caused by an earthquake, water pressure changes due to tsunami, etc.) on the seabed, and generates an observation signal indicating an observation result. As mentioned above, the observation signal generated by the observation device 15-1 is used for modulation at the optical amplifier 12a-1.

The optical demultiplexer 11b-1 demultiplexes and receives only a carrier light λ1b, which has been assigned to the submarine observation equipment 2-1 beforehand, in the optical signal wavelength-multiplexed and outputted from the land terminal apparatus 1b as a signal of the up-going line. The optical amplifier 12b-1 amplifies the carrier light demultiplexed by the optical demultiplexer 11b-1. In this case, the optical amplifier 12b-1 modulates the carrier light by changing the intensity of amplification by using an observation signal observed by the observation device 15-1. An optical amplifier 13b-1 amplifies a carrier light remaining after the carrier light for the submarine observation equipment 2-1 was extracted by the optical demultiplexer 11b-1. An optical multiplexer 14b-1 multiplexes the carrier light which was demultiplexed by the optical demultiplexer 11a-1 in the down-going direction and modulated by the optical amplifier 12a-1 in the down-going direction, with the carrier light after amplified by the optical amplifier 13b-1.

In the submarine observation equipment 2-1, the optical demultiplexer 11a-1 and the optical demultiplexer 11b-1 are equivalent to signal reception parts (a first signal reception part and a second signal reception part), the optical amplifier 12a-1 and the optical amplifier 12b-1 are equivalent to signal modulation parts, the optical multiplexer 14a-1 and the optical multiplexer 14b-1 are equivalent to signal transmission parts (a first signal transmission part and a second signal transmission part), and the observation device 15-1 is equivalent to an observation signal generation part.

Figure 6:
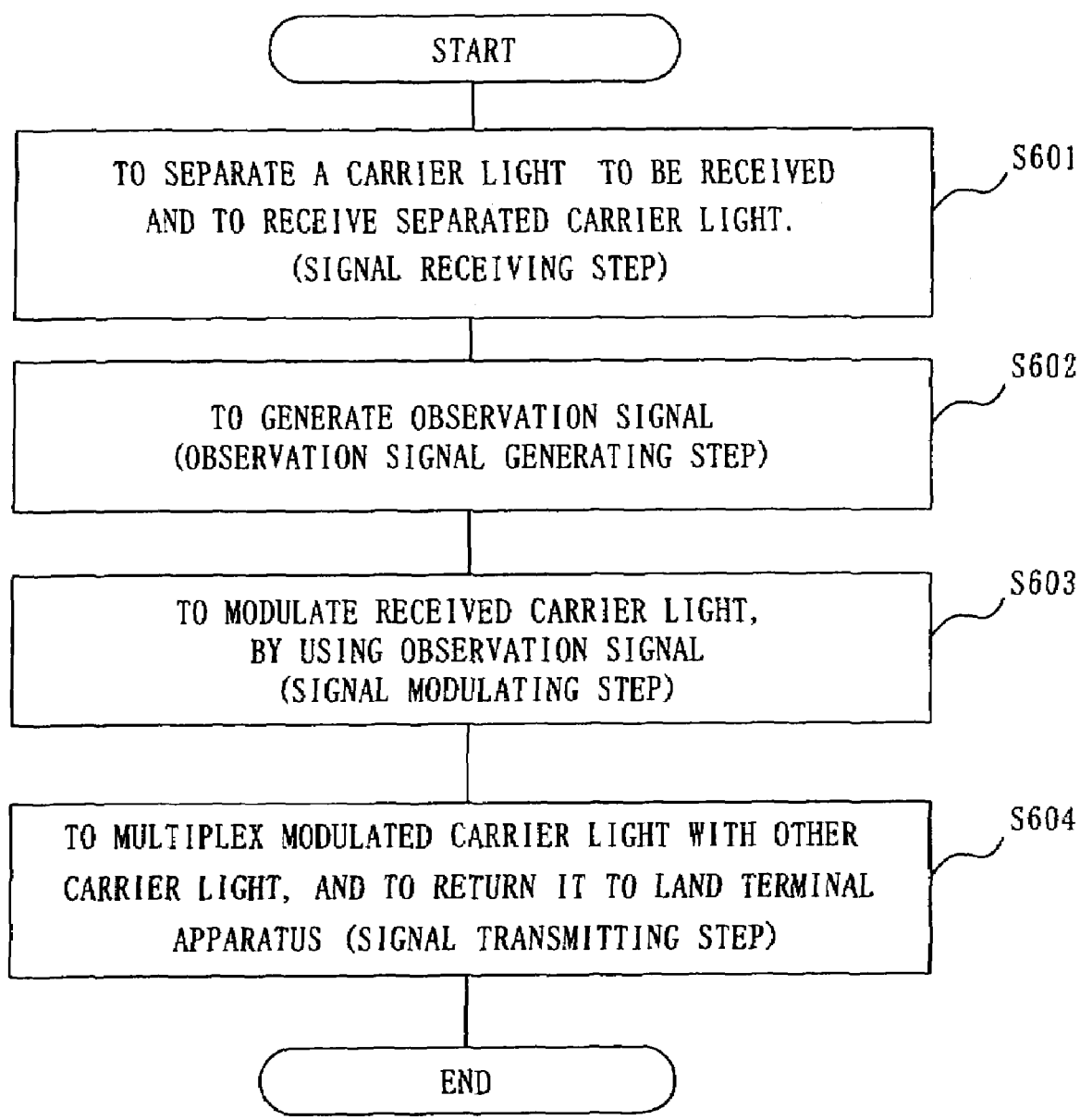
FIG. 6 is a flowchart showing an operation example of a submarine observation equipment according to Embodiment 1.

Now, operations of the submarine observation system according to the present Embodiment will be explained with reference to FIGS. 1 and 6. The land terminal apparatus 1a transmits carrier lights being different from each other and having been assigned to each of the submarine observation equipment 2-1 to 2-n in advance, from the n optical transmitters 4a-1 to 4a-n. The carrier lights being different from each other and outputted from the optical transmitters 4a-1 to 4a-n are multiplexed by the optical multiplexer 5a, and transmitted to the optical submarine cable 3a-1 of the down-going line. Similarly, in the land terminal apparatus 1b, carrier lights being different from each other and outputted from the optical transmitters 4b-1 to 4b-n are multiplexed by the optical multiplexer 5b, and transmitted to the optical submarine cable 3b-n+1 of the up-going line. Although the minimum structure required for multiplexing carrier lights is disclosed herein, it is also acceptable to provide an optical amplifier and an optical variable attenuator before and after the optical multiplexer 5. Moreover, it is also acceptable to have a structure for performing multiplexing by using a plurality of the optical multiplexers.

An optical signal wavelength-multiplexed and outputted from the land terminal apparatus 1a as a signal of the down-going line is transmitted to the submarine observation equipment 2-1 through the optical submarine cable 3a-1. In the submarine observation equipment 2-1, the optical demultiplexer 11a-1 separates only a carrier light $\lambda 1a$, having been assigned to the submarine observation equipment 2-1 in advance, and receives the separated carrier light $\lambda 1a$. (signal receiving step) (S601). The separated carrier light is transmitted to the optical amplifier 12a-1 and the other signals are transmitted to the optical amplifier 13a-1. That is, carrier lights $\lambda 2a$ to $\lambda na$ other than the separated $\lambda 1a$ are transmitted to the optical amplifier 13a-1, and the $\lambda 1a$ is not transmitted to it. The carrier lights, other than the $\lambda 1a$, transmitted to the optical amplifier 13a-1 are amplified to the same extent as the amount of attenuation received in transmission through the optical submarine cable, and transmitted to the optical multiplexer 14a-1.

Similarly, an optical signal wavelength-multiplexed and outputted from the land terminal apparatus 1b as a signal of the up-going line, is transmitted through a series of the optical submarine cables, namely from the optical submarine cable 3b-n+1 to the optical submarine cable 3b-2. Then, a carrier light $\lambda 1b$ in the optical signal is separated by the optical demultiplexer 11b-1 in the submarine observation equipment 2-1 to be received. (signal receiving step) (S601).

Moreover, in the meanwhile, an observation signal indicating an observation result is generated in the observation device 15-1. (observation signal generating step) (S602). In FIG. 6, although an observation signal is generated after the carrier light was separated and received, it is also acceptable to generate the observation signal in advance before the carrier light being separated and received.

Next, when passing through the optical amplifier 12a-1, the separated carrier light $\lambda 1a$ is modulated by the optical amplifier 12a-1 changing the intensity of amplification by using the observation signal generated by the observation device 15-1 (signal modulating step) (S603). The Raman modulation or EDFA (Er-Doped Fiber Amplifier) gain modulation is used for the modulation of the observation signal. Both the EDFA gain modulation and the Raman modulation are realized by modulating the gain of the amplifier by way of changing a pumping light source output, based on modulating a drive current of a pump LD with using the observation signal. These modulation methods can use the pump LD which has already been put in practical use in the submarine optical repeater, in the optical submarine cable system for communication. Accordingly, the method can easily secure high reliability. The carrier light $\lambda 1a$ which has been modulated directly is multiplexed with other carrier lights ($\lambda 2a$ to $\lambda na$) other than the $\lambda 1a$ of the up-going line, by the optical multiplexer 14b-1 at the up-going line side, and returned to the land terminal apparatus 1a being the transmission station, through the optical submarine cable 3b-1 (signal transmitting step) (S604). Similarly, after the separated carrier light $\lambda 1b$ of the up-going line having been modulated by an observation signal (signal modulating step) (S603), the carrier light $\lambda 1b$ is multiplexed with other carrier lights ($\lambda 2a$ to $\lambda na$) other than $\lambda 1b$ of the down-going line, by the optical multiplexer 14a-1 at the down-going line side, and returned to the land terminal apparatus 1b being the transmission station, through the optical submarine cable 3a-2 (signal transmitting step) (S604).

Furthermore, similarly, in a submarine observation equipment 2-k (k is an integer of $1 \leq k \leq n$), the light of wavelength $\lambda k$ assigned beforehand is separated and modulated by an observation signal, then multiplexed with carrier lights other than the carrier light $\lambda k$. Then, the signal is transmitted to the land terminal apparatus being the transmission station, through the optical submarine cable.

Moreover, the optical signals $\lambda 1$ to $\lambda n$ modulated by the observation signal in each submarine observation equipment 2-1 to 2-n are respectively returned to each of the land terminal apparatuses 1a and 1b. Then, the optical signal returned to the land terminal apparatus is separated into each wavelength by the optical demultiplexers 6a and 6b. Then, each of the optical receivers 7a-1 to 7a-n, and 7b-1 to 7b-n corresponding to each wavelength, receives each optical signal.

In addition, although only one observation device 15 is provided in each submarine observation equipment herein, it is also acceptable to provide a plurality of observation devices 15 in each submarine observation equipment and to transmit a plurality of observation signals as a collection to the land terminal apparatus here.

It is also acceptable to utilize an external modulator, such as LN modulator (LN: LiNbO3, niobium oxide lithium) and EA modulator (EA: Electro Absorption), for modulating a carrier light, instead of the optical amplifier.

Figure 2:
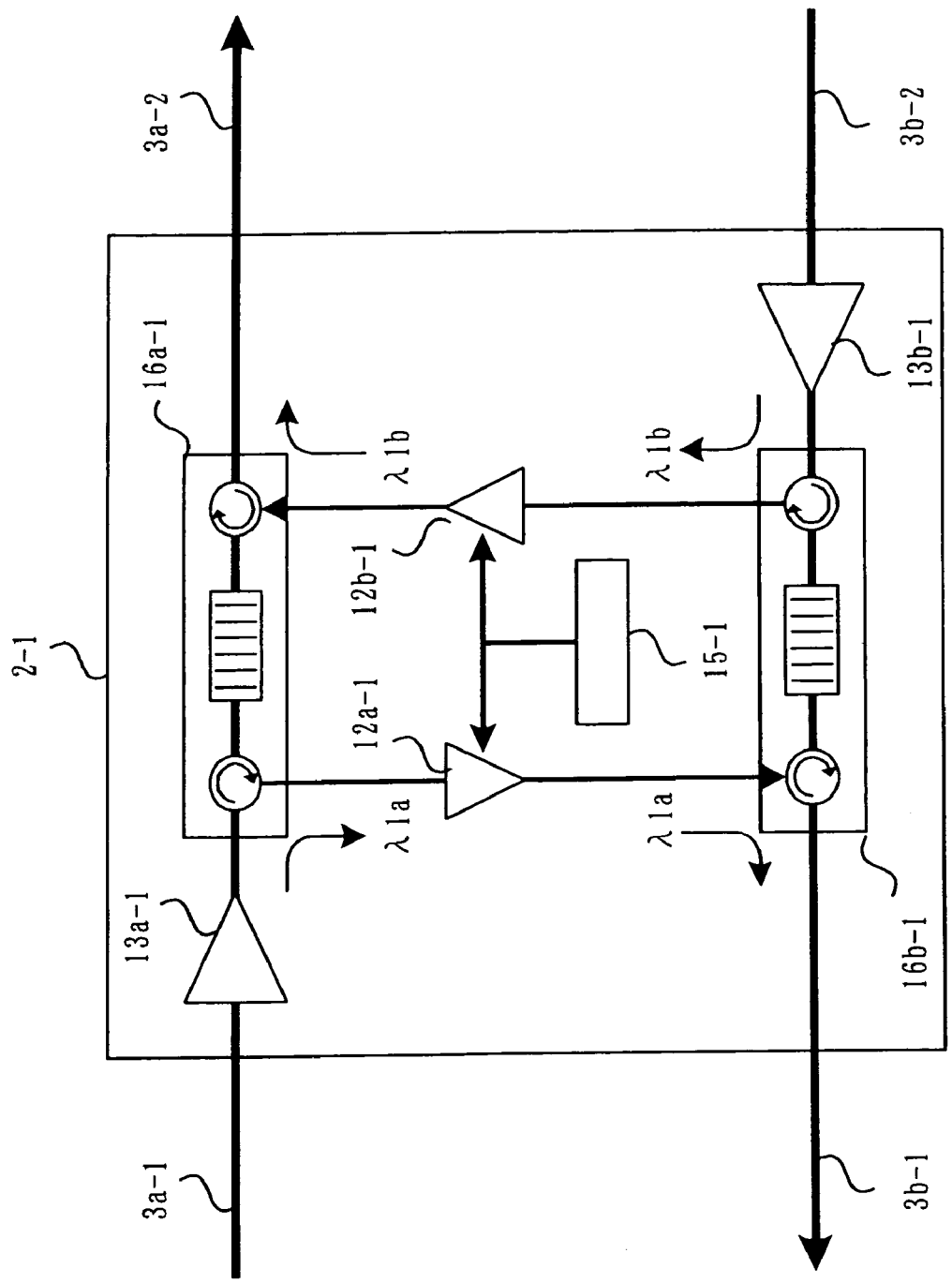
FIG. 2 shows a structure example of a submarine observation equipment using an OADM.

Instead of the optical demultiplexer 11 and the optical multiplexer 14 in the submarine observation equipment 2, it is also acceptable to have a structure in which an OADM 16 (Optical Add Drop Multiplexer) integrating an optical multiplex function and an optical demultiplex function in one is used as shown in FIG. 2. In the case of using the OADM 16, the optical signal wavelength-multiplexed and outputted from the land terminal apparatus 1a as a signal of the down-going line, after being transmitted through the optical submarine cable 3a-1, reaches the submarine observation equipment 2-1. Then, after being amplified by the optical amplifier 13a-1, the optical signal is transmitted to the OADM 16a-1 and modulated by changing the intensity of amplification by using an observation signal observed by the observation device 15-1. The modulated carrier light $\lambda 1a$ is incident onto the OADM 16b-1 in the up-going line direction, multiplexed with carrier lights $\lambda 2a$ to $\lambda na$ in the up-going direction other than $\lambda 1a$, in the OADM 16b-1, and transmitted to the optical submarine cable 3b-1 at the down-going line side. Operations similar to the above are performed for the carrier light $\lambda 1b$ transmitted from the up-going line side.

Figure 3:
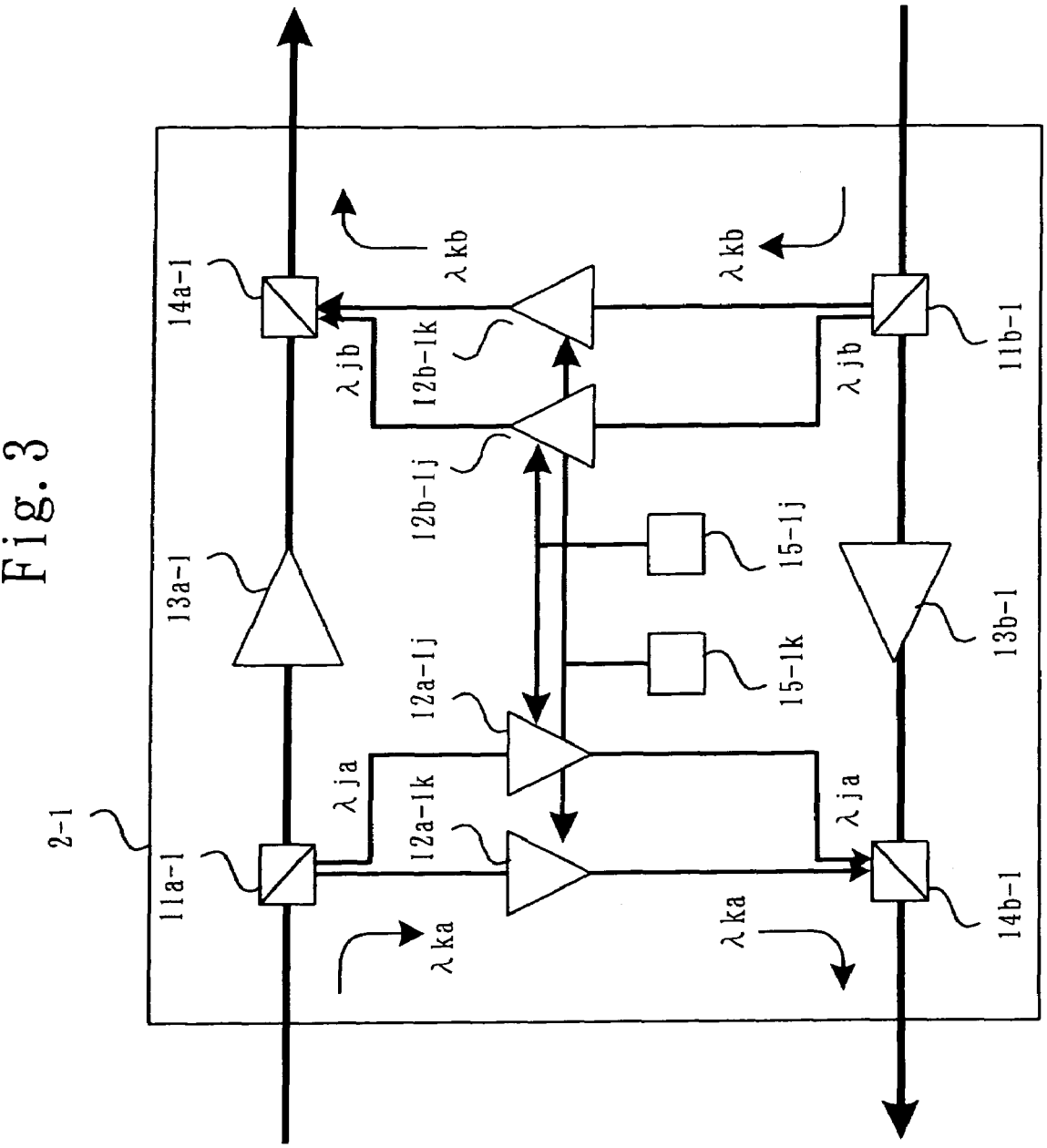
FIG. 3 shows a structure example of a submarine observation equipment for transmitting a plurality of observation signals.

The carrier light assigned to each submarine observation equipment is one wave in the above explanation. However, it is also acceptable to assign carrier waves equal to two or more than two to one submarine observation equipment. In this case, as shown in FIG. 3, plural (herein, two waves) carrier lights $\lambda ka$ and $\lambda ja$ (k and j are natural numbers) are demultiplexed by the optical demultiplexer 11a-1, respectively modulated by the optical amplifiers 12a-1k and 12a-1j by using observation signals from observation devices 15-1k and 15-1j and transmitted in the up-going direction. Thus, it is specially effective to use carrier lights of two or more than two waves when mass data transmission is needed in one submarine observation equipment. Moreover, although observation signals of a plurality of observation devices are assigned to a plurality of carrier lights in this case, it is also acceptable to assign an observation signal of one observation device to a plurality of carrier lights by separating the observation signal of one observation device.

Figure 4:
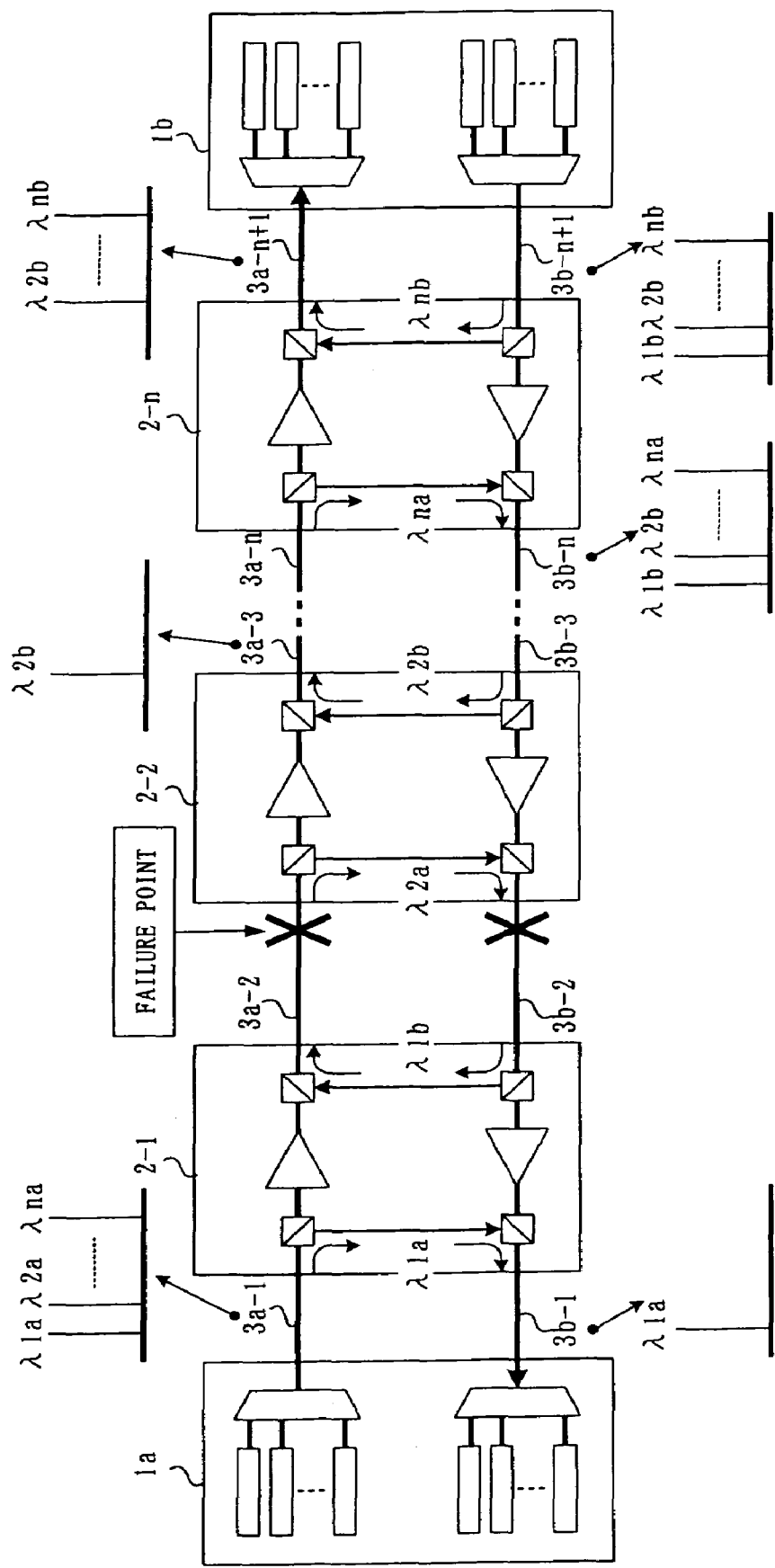
FIG. 4 shows a structure illustrating an example of system operations at the time of a cable failure.

In the above-mentioned submarine observation system, operations performed when a cable failure caused by an optical submarine cable being cut off by some factor occurs are shown in FIG. 4. FIG. 4 shows a spectrum of carrier lights which go through the cable at each point of an optical submarine cable. Assuming that the cable failure occurs at the optical submarine cables 3a-2 and 3b-2, since the optical fibers of the up-going line and the down-doing line are usually accommodated in one cable, both the optical fibers of the up-going and the down-going are simultaneously broken at the time of the failure, such as a cable cut, occurring. In addition, it is assumed that an electric power supply for each submarine observation equipment can be continuously performed even if the cable failure occurs.

When a failure occurs at the above-mentioned part, the carrier light $\lambda 1b$ from the optical submarine cable 3b-2 of the up-going line does not come into the submarine observation equipment 2-1, but the carrier light $\lambda 1a$ returned from the down-going line is output to the optical submarine cable 3b-1. Then, as only the carrier light $\lambda 1a$ can be received by the land terminal apparatus 1a, only an observation signal of the submarine observation equipment 2-1 is received. On the contrary, although the carrier light from the optical submarine cable 3a-2 of the down-going line does not come into the submarine observation equipment 2-2, the carrier light $\lambda 2b$ returned from the up-going line is multiplexed with other lights and outputted to the optical submarine cable 3a-3. Based on similar operations, the land terminal apparatus 1b can receive carrier lights of $\lambda 2b$ to $\lambda nb$, and observation signals of the submarine observation equipment 2-2 to n. Then, observation signals of all the submarine observation equipment can be continuously obtained by the two land terminal apparatuses even if a cable failure occurs.

As mentioned above, according to the submarine observation system of the present Embodiment, from the land terminal apparatus to each submarine observation equipment installed on the seabed, carrier lights different from each other which have been assigned to each submarine observation equipment in advance are transmitted to the optical submarine cable by the WDM transmission system, and each submarine observation equipment selectively separates a peculiar carrier light assigned to each submarine observation equipment from the multiplexed carrier light. The carrier light transmitted here is supposed to be an unmodulated light whose data has not been modulated. Each submarine observation equipment directly modulates the carrier light selectively separated, as a light, by an observation signal observed by each submarine observation equipment with using an observation device, such as a sensor. Then, each submarine observation equipment multiplexes the modulated carrier light with a signal being transmitted to each submarine observation equipment, and transmits the multiplexed one back to the land terminal apparatus being the transmission station.

As mentioned above, the submarine observation system according to the present Embodiment has a structure where a wavelength division multiplexing transmission system is applied, and after directly modulating the carrier light assigned in advance by using an optical amplifier in each submarine observation equipment, each submarine observation equipment sends the modulated carrier light back to the land terminal apparatus being the transmission station. Therefore, the number of the optical fibers needed for each submarine observation equipment can be reduced, and the optical transmitter in the submarine observation equipment can be unnecessary. Moreover, even when a failure such as a cut off of the optical submarine cable occurs, the land terminal apparatus can continuously receive an observation signal existing before the failure occurrence point. Furthermore, in the case of increasing building observation points, it is just necessary to build a new receiver-transmitter which receives and transmits a new carrier light in the land terminal apparatus and a new submarine observation equipment. By dint of these effects, cost increase of the whole system can be suppressed. Moreover, since a highly robust observation system can be structured, high reliability and extensibility can be acquired. Although the carrier light is an unmodulated light herein, the same effect can be obtained when the carrier light is a modulation light for performing monitoring control of the submarine observation equipment, for example. The circuit can be simplified by using an unmodulated light, and a modulated light or an unmodulated light can be selected according to the demand of the system.

According to the structure of Embodiment 1, two land terminal apparatuses are provided to be opposite. However, the same effect can be acquired in the case of three or more than three land terminal apparatuses being provided. Moreover, even when only one land terminal apparatus is provided, the same effect can be acquired except that an observation signal of the submarine observation equipment located farther than the failure occurrence point from the land terminal apparatus is no longer acquired at the time of the failure occurrence.

Embodiment 2

Figure 5:
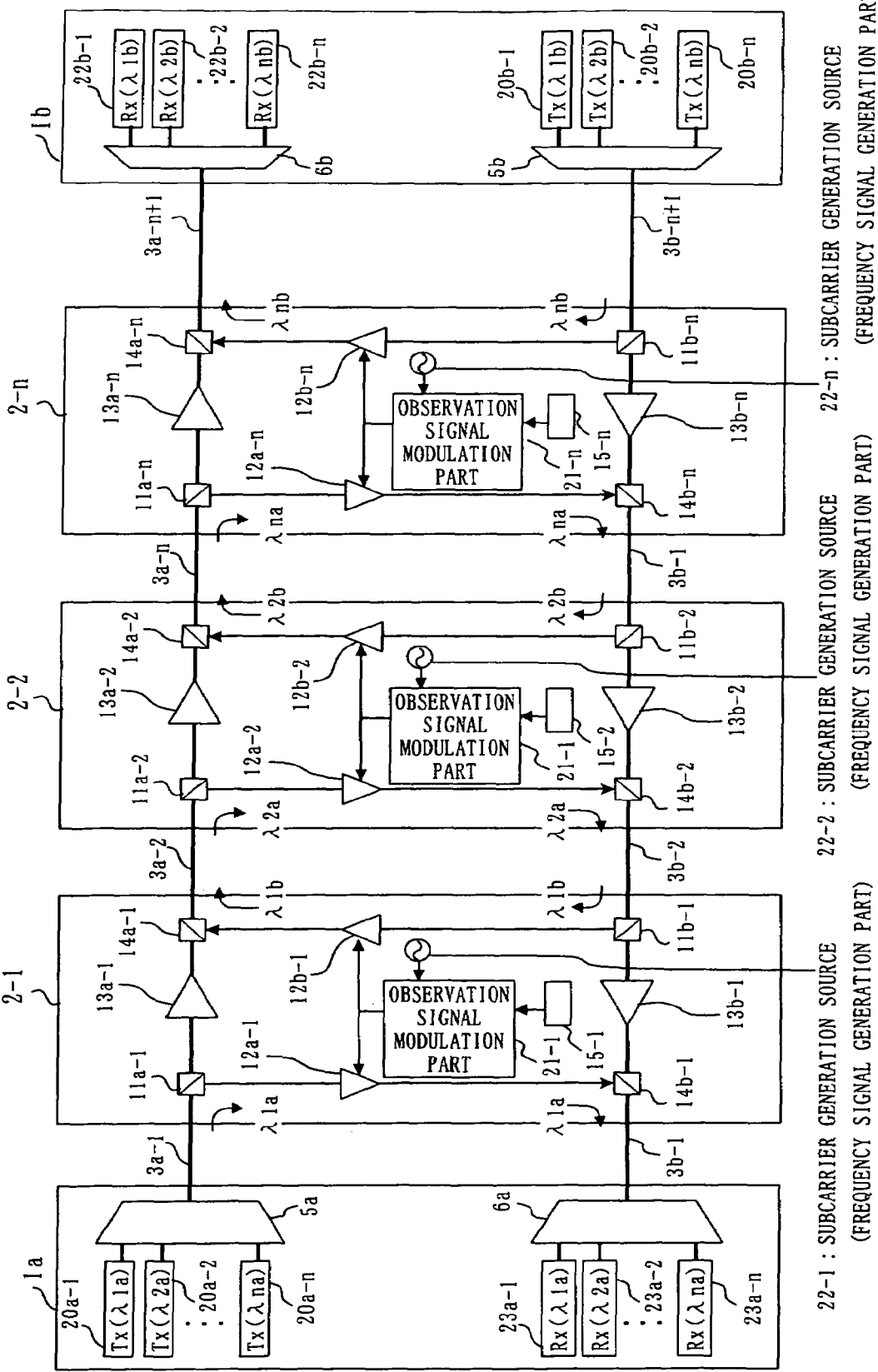
FIG. 5 shows a structure example of a submarine observation system according to Embodiment 2.

Next, the submarine observation system according to Embodiment 2 will be explained. FIG. 5 is a structure figure showing an example of the submarine observation system according to Embodiment 2. Compared with the system shown in FIG. 1, the structure of FIG. 5 is the same as that of FIG. 1 except for a subcarrier generation source (frequency signal generation part) 22 and an observation signal modulation part 21 provided in the submarine observation equipment 2, and an optical transmitter 20 and an optical receiver 23 for subcarrier modulation provided in the land terminal apparatus 1.

Next, operations will be explained with reference to FIG. 5. Operations of the first set, i.e. the submarine observation equipment of n=1 will be explained as an example. In an optical transmitter 20a-1 of the land terminal apparatus 1a, the carrier light $\lambda 1a$ including a command signal for controlling the submarine observation equipment 2-1 is subcarrier-modulated by using a predefined frequency, the carrier light $\lambda 1a$ subcarrier-modulated by the optical transmitter 20a-1 is multiplexed with other optical signals by the optical multiplexer 5a, and the multiplexed carrier light $\lambda 1a$ is transmitted from the optical submarine cable. The submarine observation equipment 2-1 demultiplexes the carrier light $\lambda 1a$ by the optical demultiplexer 11a-1, and the demultiplexed carrier light $\lambda 1a$ passes through the optical amplifier 12a-1. In the meanwhile, an observation signal generated by the observation device 15-1 is transmitted to an observation signal modulation part 21-1, and the observation signal is converted into a frequency modulation signal whose subcarrier is a predefined frequency outputted from a subcarrier generation source 22-1, by the observation signal modulation part 21-1. When the carrier light $\lambda 1a$ passes the optical amplifier 12a-1, the carrier light $\lambda 1a$ is modulated by changing the intensity of amplification by the frequency modulation signal of the observation signal modulated by the observation signal modulation part 21-1. The modulated carrier light $\lambda 1a$ is multiplexed with carrier lights of the up-going line other than the $\lambda 1a$, by the optical multiplexer 14b-1 at the up-going line side, returned to the land terminal apparatus 1a being the transmission station through the optical submarine cable 3b-1, separated into each wavelength by the optical demultiplexer 6a, and received by an optical receiver 23a-1 corresponding to the wavelength of the carrier light concerned. Similarly, the separated carrier light λ1b of the up-going line is modulated by the observation signal having been modulated, multiplexed with carrier lights of the down-going line other than λ1b by the optical multiplexer 14a-1 at the down-going side, and returned to the land terminal apparatus 1b being the transmission station, through the optical submarine cable 3a-2.

As mentioned above, according to the submarine observation system of the present Embodiment, the subcarrier system is applied as a modulation method, a light serving as a carrier is transmitted from the land terminal apparatus to the optical submarine cable, and in each submarine observation equipment, an observation signal is a frequency modulation signal whose subcarrier is a frequency predefined in each submarine observation equipment, the carrier light is modulated by using the frequency-modulation signal, and the modulated carrier light is returned to the land terminal apparatus.

According to the submarine observation system of the present Embodiment, since the subcarrier transmission system is used, a plurality of different frequencies can be superimposed as a subcarrier, and a plurality of data can be simultaneously communicated by one carrier light. Therefore, it is possible to perform bi-directional communications, from the land terminal apparatus 1 to the submarine observation equipment 2-n and from the submarine observation equipment 2-n to the land terminal apparatus 1, by using one carrier light λn, by means of superimposing a command signal for controlling the submarine observation equipment 2-n from the land terminal apparatus 1, on a carrier light based on the subcarrier modulation, and of transmitting the superimposed signal. Consequently, it is possible to reduce the number of wavelength for a control signal from the land terminal apparatus to a submarine observation equipment, which is individually needed for the submarine observation equipment or collectively needed for a plurality of submarine observation equipment. As described in Embodiment 1, by providing a plurality of observation signal modulation parts which perform subcarrier modulation in the submarine observation equipment 2-n, it is possible to deal with the case of a plurality of observation signals or mass data communications.

As mentioned above, according to the submarine observation system of the present Embodiment, since the system structure applying the subcarrier method is provided, it is enough to have only one carrier light for transmission and reception, which suppresses the apparatus scale increase and the cost increase.

The submarine observation system including the submarine observation equipment and the land terminal apparatus has been explained in the above. However, the present invention is not limited to the above, and the present invention can be applicable to a system including an observation apparatus for performing some observation and a management apparatus for receiving a notice of an observation result from the observation apparatus.

Having thus described several particular embodiments of the present invention, various alterations, modifications, and improvements will readily occur to those skilled in the art. Such alterations, modifications, and improvements are intended to be part of this disclosure, and are intended to be within the spirit and scope of the present invention. Accordingly, the foregoing description is by way of example only, and is not intended to be limiting. The present invention is limited only as defined in the following claims and the equivalents thereto.

What is claimed is:

1. An observation apparatus which performs prescribed observation and notifies a management apparatus of an observation result, the observation apparatus comprising:
    a signal reception part to receive a signal transmitted from the management apparatus;
    an observation signal generation part to perform the prescribed observation and to generate an observation signal indicating the observation result;
    a signal modulation part to modulate the signal received by the signal reception part, by using the observation signal generated by the observation signal generation part; and
    a signal transmission part to return the signal modulated by the signal modulation part to the management apparatus,
    wherein:
    the signal reception part receives the signal transmitted from the management apparatus through a first transmission line connected to the management apparatus;
    the signal transmission part returns the signal modulated by the signal modulation part to the management apparatus through a second transmission line connected to the management apparatus;
    the observation apparatus is one of a plurality of observation apparatuses cascadingly connected to the management apparatus through the first transmission line and the second transmission line;
    the signal reception part separates a signal which is to be received, from a multiplexed signal transmitted from the management apparatus through the first transmission line and made by multiplexing a plurality of signals for a plurality of observation apparatuses, and receives the signal separated;
    the signal modulation part modulates the signal separated and received by the signal reception part, by using the observation signal; and
    the signal transmission part multiplexes the signal modulated by the signal modulation part and a signal of other observation apparatus, which is communicated through the second transmission line, and returns a multiplexed signal to the management apparatus through the second transmission line.

2. The observation apparatus according to claim 1, wherein:
    the signal reception part receives an optical signal transmitted from the management apparatus;
    the signal modulation part modulates the optical signal received by the signal reception part, by using the observation signal generated by the observation signal generation part; and
    the signal transmission part returns the optical signal modulated by the signal modulation part to the management apparatus.

3. The observation apparatus according to claim 1, wherein:
    the signal reception part separates an optical signal of a specific wavelength which is to be received, from a multiplexed optical signal transmitted from the management apparatus through the first transmission line and made by multiplexing a plurality of optical signals whose wavelengths are different from each other depending upon each observation apparatus, and receives the optical signal separated;

the signal modulation part modulates the optical signal separated and received by the signal reception part, by using the observation signal; and the signal transmission part multiplexes the optical signal modulated by the signal modulation part and an optical signal of other observation apparatus, which is communicated through the second transmission line, and returns a multiplexed optical signal to the management apparatus through the second transmission line.

4. The observation apparatus according to claim 1, wherein the signal modulation part performs EDFA (Er Doped Fiber Amplifier) gain modulation.

5. The observation apparatus according to claim 1, wherein the signal modulation part performs Raman gain modulation.

6. The observation apparatus according to claim 1, wherein the signal modulation part performs LN (LiNbO$_3$, niobium oxide lithium) modulation.

7. The observation apparatus according to claim 1, wherein the signal modulation part performs EA (Electro Absorption) modulation.

8. The observation apparatus according to claim 1, further comprising:

a frequency signal generation part configured to generate a frequency signal of a specific frequency which is different depending upon each observation apparatus and an observation signal modulation part configured to modulate the observation signal by using the frequency signal generated by the frequency signal generation part, the signal modulation part configured to modulate the signal separated and received by the signal reception part, by using the observation signal modulated by the observation signal modulation part.

9. The observation apparatus according to claim 8, wherein the signal reception part separates an optical signal of a specific frequency which is to be received, from a multiplexed optical signal transmitted from the management apparatus through the first transmission line and made by multiplexing a plurality of optical signals whose frequencies are different from each other depending upon each observation apparatus, and receives the optical signal separated, the signal modulation part modulates the optical signal separated and received by the signal reception part, by using the observation signal modulated by the observation signal modulation part, and the signal transmission part multiplexes the optical signal modulated by the signal modulation part and an optical signal of other observation apparatus, which is communicated through the second transmission line, and returns a multiplexed optical signal to the management apparatus through the second transmission line.

10. The observation apparatus according to claim 1, wherein:

the observation apparatus is arranged on seabed, observes a physical phenomenon at the seabed, and notifies a management apparatus arranged on land of an observation result.

11. An observation apparatus which performs prescribed observation and notifies a management apparatus of an observation result, the observation apparatus comprising:

a signal reception part to receive a signal transmitted from the management apparatus;

an observation signal generation part to perform the prescribed observation and to generate an observation signal indicating the observation result;

a signal modulation part to modulate the signal received by the signal reception part, by using the observation signal generated by the observation signal generation part; and a signal transmission part to return the signal modulated by the signal modulation part to the management apparatus, wherein:

the signal reception part receives the signal transmitted from the management apparatus through a first transmission line connected to the management apparatus, the signal transmission part returns the signal modulated by the signal modulation part to the management apparatus through a second transmission line connected to the management apparatus;

the observation apparatus is connected to a first management apparatus which is connected to an end of the first transmission line and an end of the second transmission line, through the first transmission line and the second transmission line;

the observation apparatus is also connected to a second management apparatus which is connected to other end of the first transmission line and other end of the second transmission line, through the first transmission line and the second transmission line;

the signal reception part includes a first signal reception part to receive a first signal transmitted from the first management apparatus through the first transmission line, and a second signal reception part to receive a second signal transmitted from the second management apparatus through the second transmission line;

the signal modulation part respectively modulates the first signal and the second signal by using the observation signal; and the signal transmission part includes:

a first signal transmission part to return the first signal modulated by the signal modulation part to the first management apparatus through the second transmission line and a second signal transmission part to return the second signal modulated by the signal modulation part to the second management apparatus through the first transmission line.

12. The observation apparatus according to claim 11, wherein the observation apparatus includes at least one of an OADM (Optical Add Drop Multiplexer) integrating the first signal reception part and the second signal transmission part and an OADM integrating the second signal reception part and the first signal transmission part.

13. The observation apparatus according to claim 11, wherein the signal reception part is configured to receive an optical signal transmitted from the management apparatus, to modulate the optical signal received by the signal reception part, by using the observation signal generated by the observation signal generation part, and part to return the optical signal modulated by the signal modulation part to the management apparatus.

14. The observation apparatus according to claim 11, wherein the signal modulation part performs EDFA (Er Doped Fiber Amplifier) gain modulation.

15. The observation apparatus according to claim 11, wherein the signal modulation part performs Raman gain modulation.

16. The observation apparatus according to claim 11, wherein the signal modulation part performs LN (LiNbO$_3$, niobium oxide lithium) modulation.

17. The observation apparatus according to claim 11, wherein the signal modulation part performs EA (Electro Absorption) modulation.

18. An observation system comprising:
- plural management apparatuses and
- observation apparatuses configured to perform prescribed observations and notify the management apparatuses of observation results,
- each management apparatus configured to transmit an optical signal to at least one observation apparatus;
- each observation apparatus configured to receive the optical signal transmitted from at least one management apparatus, perform a prescribed observation, generate an observation signal indicating an observation result, modulate the optical received signal using a generated observation signal, and return a modulated optical signal to management apparatus serving as a transmission station;
- the plural management apparatuses including a first management apparatus connected to an end of a first transmission line and an end of a second transmission line and, a second management apparatus connected to other end of the first transmission line and other end of the second transmission line;
- plurality of said observation apparatuses connected to the first management apparatus and the second management apparatus through the first transmission line and the second transmission line;
- each of the plurality of observation apparatuses cascadingly connected through the first transmission line and the second transmission line;
- the first management apparatus configured to transmit a multiplexed signal made by multiplexing a plurality of signals, as a first multiplexed signal, to the plurality of observation apparatuses, through the first transmission line;
- the second management apparatus configured to transmit a multiplexed signal made by multiplexing a plurality of signals, as a second multiplexed signal, to the plurality of observation apparatuses, through the second transmission line; and
- each observation apparatus configured
    - to separate a signal which is to be received, from the first multiplexed signal transmitted from the first management apparatus through the first transmission line, to receive the signal separated as a first signal,
    - to separate a signal which is to be received, from the second multiplexed signal transmitted from the second management apparatus through the second transmission line, and to receive the signal separated as a second signal,
    - to modulate the first signal and the second signal respectively,
    - to multiplex a modulated first signal and a signal of other observation apparatus, which is communicated through the second transmission line and,
    - to return a multiplexed signal to the first management apparatus through the second transmission line,
    - to multiplex a modulated second signal and a signal of other observation apparatus, which is communicated through the first transmission line, and
    - to return a multiplexed signal to the second management apparatus through the first transmission line.

19. The observation system according to claim 18, further comprising:
- at least one management apparatus arranged on land, and
- at least one observation apparatus arranged on seabed which observes a physical phenomenon at the seabed, and notifies an observation result to the management apparatus on land.

\* \* \* \* \*